Sept. 20, 1949.  W. F. HUCK  2,482,620
ROUTING MACHINE
Filed Aug. 22, 1945  7 Sheets-Sheet 1

INVENTOR.
William F. Huck
BY Albert J. Horton

Sept. 20, 1949.   W. F. HUCK   2,482,620
ROUTING MACHINE

Filed Aug. 22, 1945   7 Sheets-Sheet 2

INVENTOR.
William F. Huck
BY Albert J. Horton

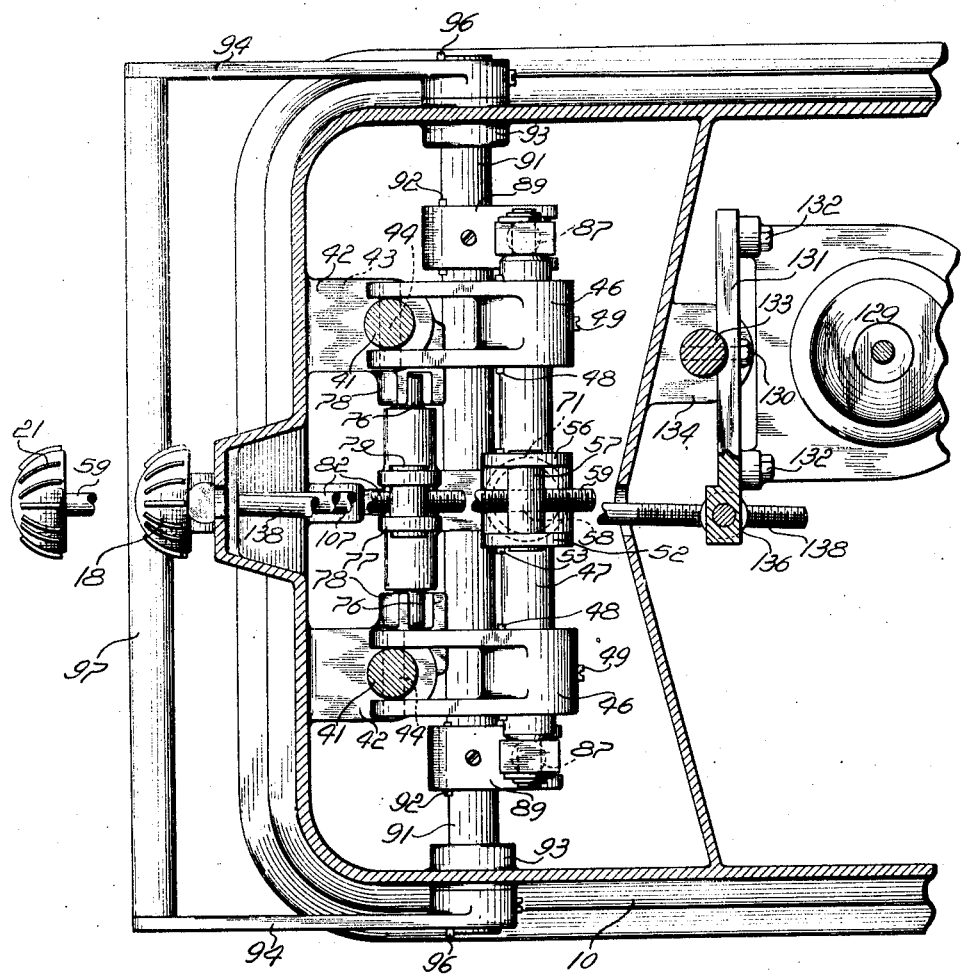

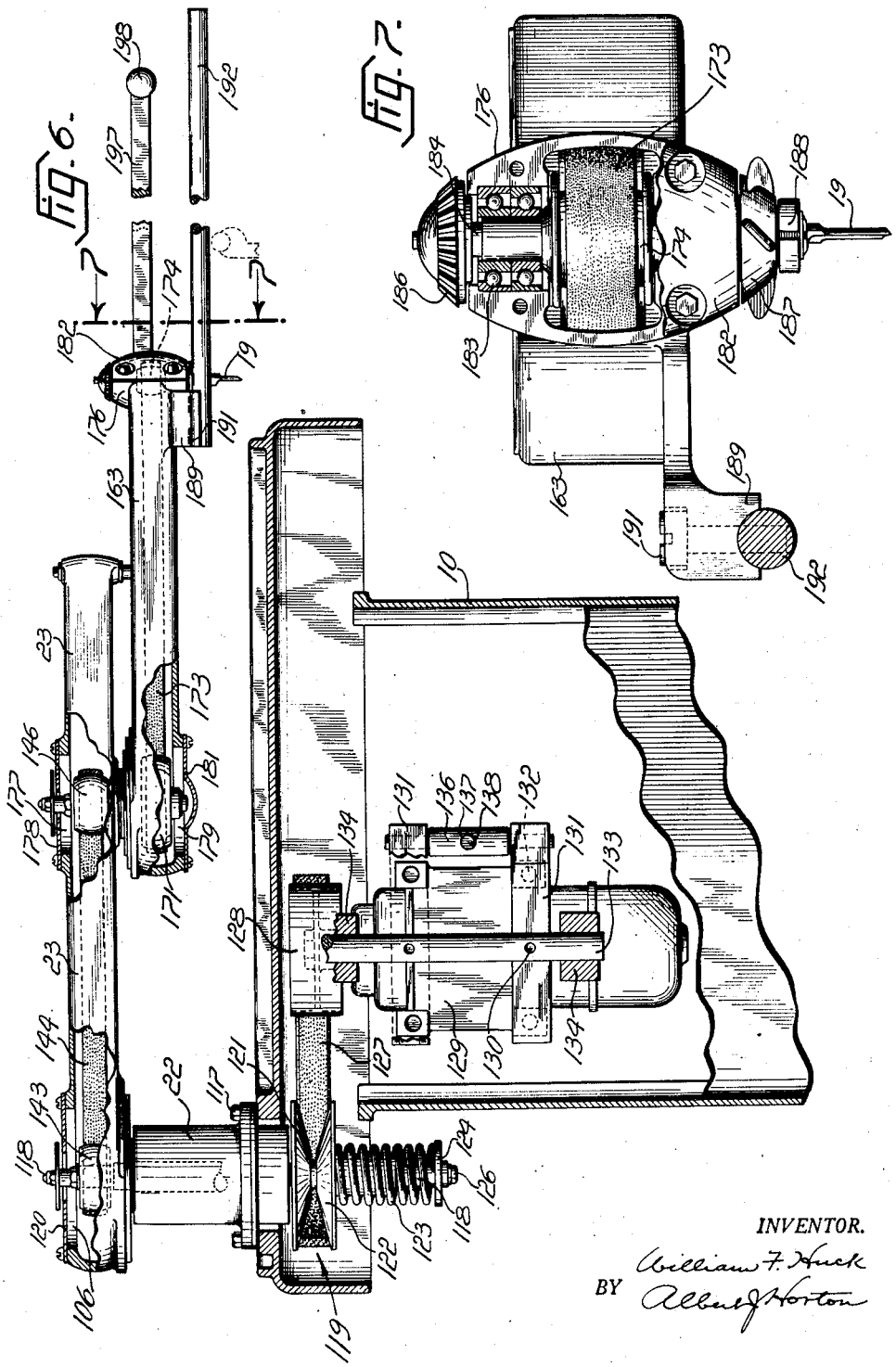

Sept. 20, 1949. W. F. HUCK 2,482,620
ROUTING MACHINE
Filed Aug. 22, 1945 7 Sheets-Sheet 7
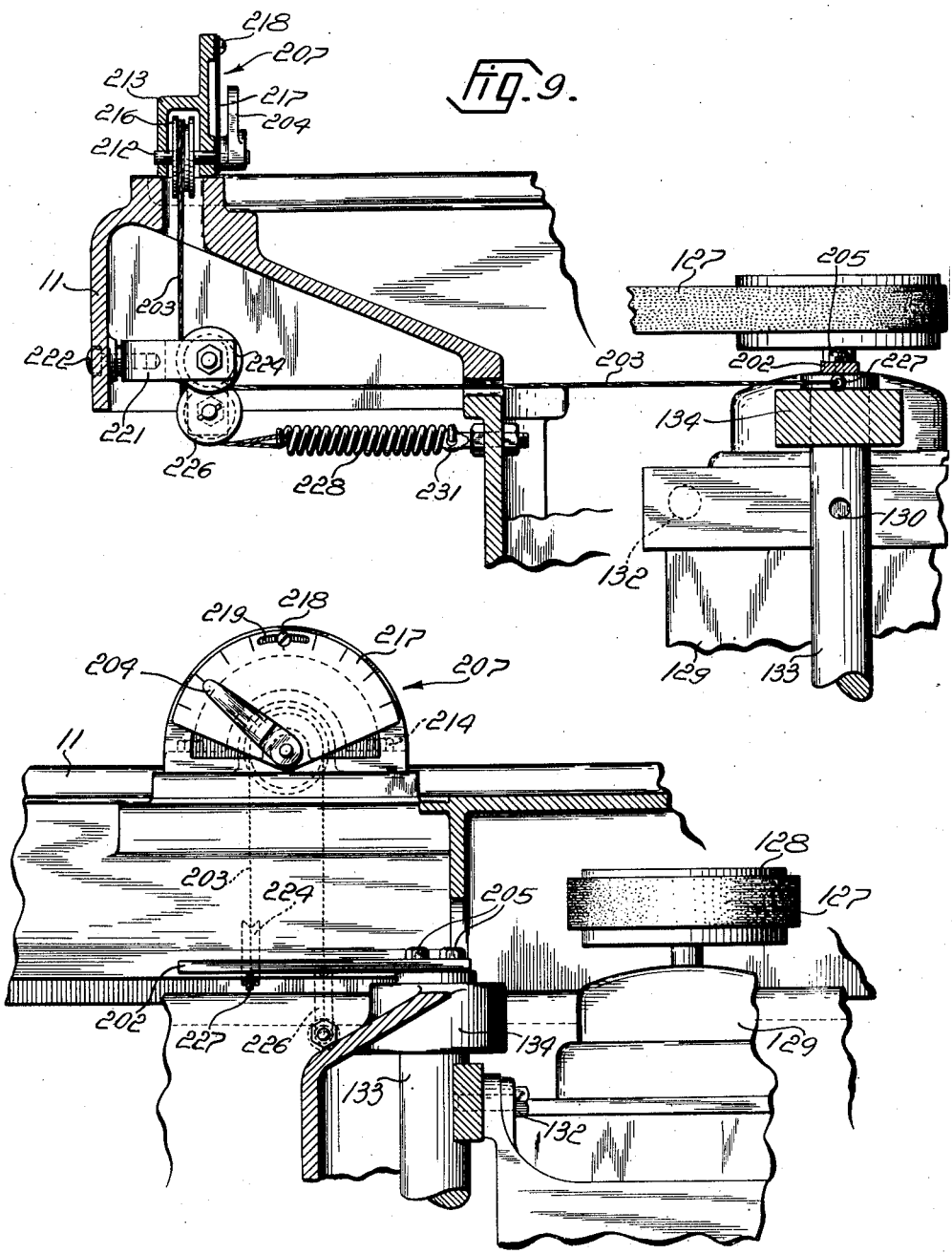
INVENTOR
William F. Huck
BY
Albert J Horton
ATTORNEY Patented Sept. 20, 1949

2,482,620

UNITED STATES PATENT OFFICE 2,482,620

ROUTING MACHINE

William F. Huck, Forest Hills, N. Y., assignor to R. Hoe & Co., Inc., Bronx, N. Y., a corporation of New York Application August 22, 1945, Serial No. 611,991

4 Claims. (Cl. 90—15)

1

This invention relates to routing machines, and especially such machines, used for routing flat electrotype and stereotype printing plates and commonly known as radial arm routers.

An object of the invention is to provide a routing machine incorporating various improvements, including means whereby the machine can be controlled more accurately and with less effort on the part of the operator than machines heretofore available, also mechanism whereby the speed of the cutting tool is indicated on a calibrated dial and may be conveniently controlled over a wide range, in fine gradations, and also including more complete guarding and enclosure of all moving parts.

It is also an object of the invention to provide a routing machine of generally improved construction, that will be simple, durable and relatively inexpensive in construction, as well as convenient, practical, serviceable and efficient in use.

Other objects, novel features and advantages will be apparent from the specification and accompanying drawings.

A practical embodiment of the invention is illustrated in the accompanying drawings, in which:

Figure 5 is a horizontal sectional view taken on the irregular line 5—5 of Figure 4 and looking in the direction of the arrows;

Figure 6 is a partly broken-away view of a portion of the mechanism shown in Figures 1 to 3;

Figure 7 is a partly broken-away front view of the router head taken on the line 7—7 of Figure 6 and looking in the direction of the arrows;

Figure 8 is a horizontal sectional view taken on the line 8—8 of Figure 3 and looking in the direction of the arrows;

Figure 9 is a sectional view taken on the line indicated by arrows 9 of Figure 3; and Figure 10 is a view of the parts shown in Figure 9 as seen from the right of that figure.

Figure 1:
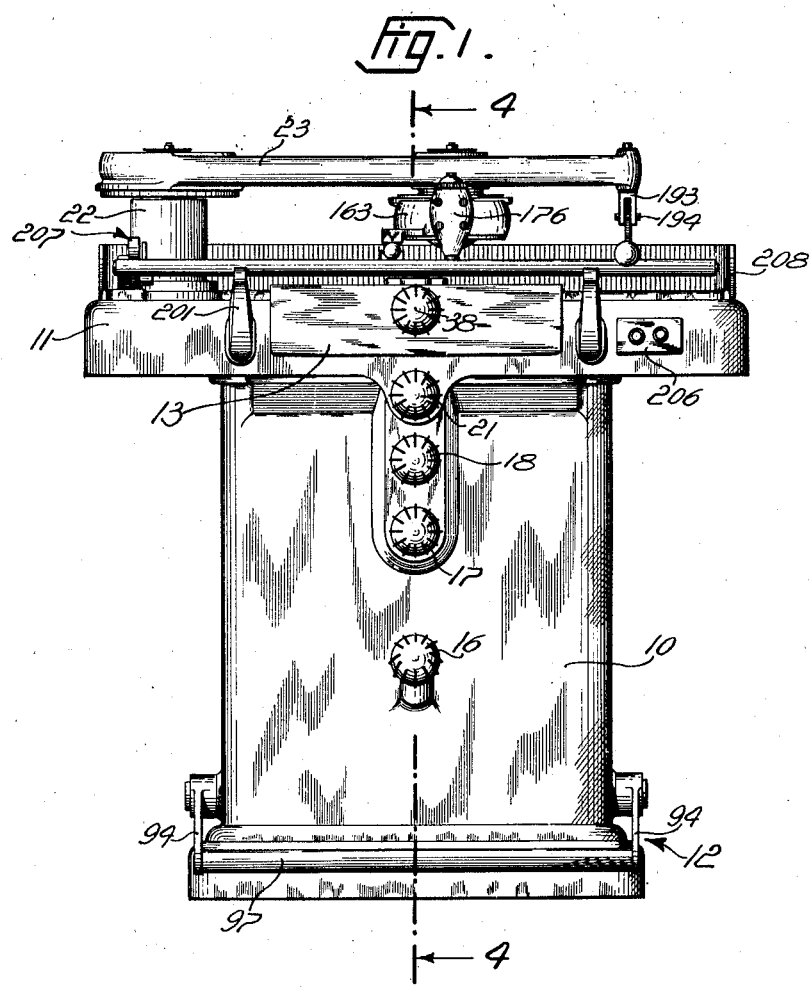
Figure 1 is a front elevational view of the new and improved routing machine.

The routing machine shown in the drawings includes, a main base 10 that carries an upper portion or frame 11. The base supports a plurality of controlling mechanisms (Figure 4), including a treadle 12 for raising a table 13 with a printing plate 14 thereon, a hand wheel 16 for adjusting the length of lift of the table 13, a hand wheel 17 for making adjustments to compensate for the weight of different printing plates, and a hand wheel 18 for adjusting the speed at which a router bit 19 (Figures 6 and 7) is rotated. The frame 11 supports a hand wheel 21 for adjusting the height of table 13 and plate 14, and consequently the depth to which the router bit will cut when the treadle 12 is pressed down against its stop. The frame 11 also carries a post 22 (Figures 1 and 8) for supporting a main router arm 23.

Figure 4:
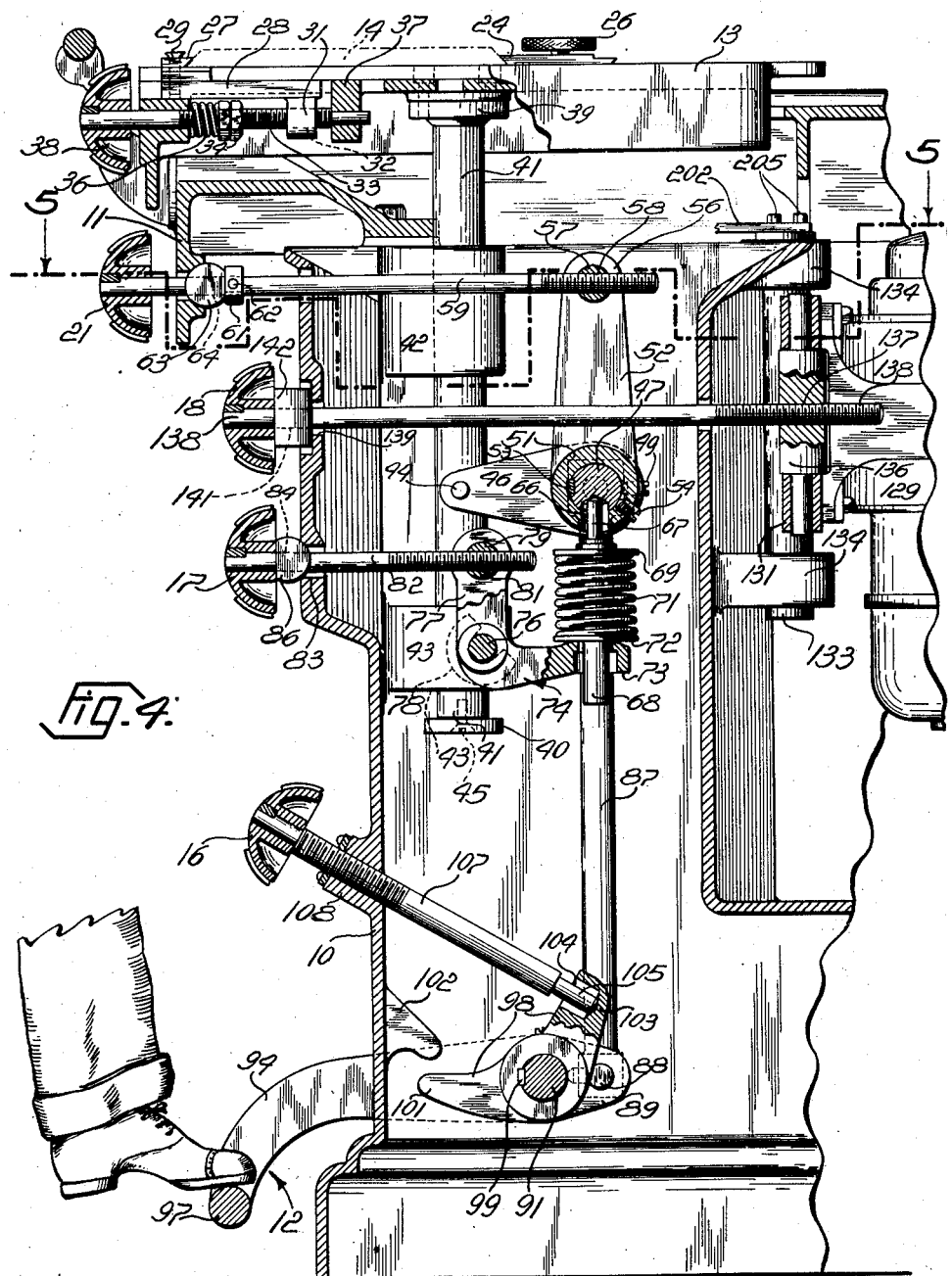
Figure 4 is a sectional view taken on the center line 4—4 of Figure 1, with certain of the upper portions omitted and looking in the direction of the arrows. The printing plate and supporting mechanisms are shown in the raised position.

The printing plate 14 (Figure 4) is held in place on the work table 13 by a rear clamp 24, that may be variously positioned by a known mechanism under the control of a hand wheel 26, and by a front clamp 27 held to a holder 28 by a pin 29. The holder 28 is provided with a lug 31, having a threaded hole 32 for receiving a screw 33. Lock nuts 34 and a spring 36 bias the screw toward the right and into a hole in a bearing bracket 37. The left end of the screw 33, as seen in Figure 4, has a hand wheel 38 by means of which the front clip may be moved to clamp or unclamp the plate 14. The front clamp 27 is thus resiliently pressed against the edge of the plate 14.

The work table 13 is raised and lowered by a mechanism best shown in Figures 4 and 5. The table 13 is secured by screws to a pair of collars 39, each of which is integral with one of a pair of table lifting rods 41. These lifting rods are arranged to slide vertically in upper and lower brackets 42 and 43, formed as an integral part of the base 10, and each rod 41 has a stop plate 49 secured to its lower end by a screw 45. Each rod 41 also carries a pin 44 to which one end of a bifurcated table lifting arm 46 is pivotally attached. The other end of each of the arms 46 is secured to an intermediate support member or shaft 47 (Figure 5) by means of keys 48 and set screws 49. A hub 51 (Figure 4) of an adjusting arm 52 is secured to the shaft 47 midway between the arms 46 by means of a key 53 and a set screw 54, and the bifurcated end 56 of this arm carries a pivot pin 57, the center of which has a threaded diametral hole 58 through which the threaded end of a table adjusting screw 59 is screwed. The unthreaded end of the screw 59 carries a collar 61, that is secured thereto by a set screw 62, and engages a cylindrical swivel block 63 that is seated in a recess in the frame 11. The swivel block has a diametral hole 64 through which passes the end of the screw 59 that carries the hand wheel 21.

The table lifting shaft 47 (Figure 4) is partially supported on a reduced upper end 67 of a spring guide 68, that fits loosely in a radial hole 66 in the lower portion of the tub 51 and the shaft 47. A collar 69 is secured to the spring guide 68 and acts as an upper abutment for a resilient table-balancing spring 71, which carries a portion of the weight of the table 13. The lower end of the spring 71 abuts a collar 72 that is slidably mounted on the rod 68 and which is supported by an arm 73 of a bell crank 74. The bell crank is rotatably supported on a shaft 76, the ends of which (Figure 5) rest in seats 78 formed in the two lower brackets 43. Another arm 77 of the bell crank is bifurcated and thereby pivotally supports a pin 79 having a threaded diametral hole 81. A table balancing screw 82 (Figure 4) has its threaded end screwed into the hole 81, and its unthreaded end passes through a hole 83 in the base 10 and thence through a diametral hole 84 in a swivel block 86. The outer end of the screw 82 carries the hand wheel 17, and the inner face of the wheel 17 abuts the swivel block 86, which in turn abuts the face of the base 10. The rods 41 as above described thus constitute the first support for the table and these, in turn, are pivotally supported from a second support provided for by the shaft 47. Arrangements are provided to elevate and lower the mechanism by means of a foot pedal and for also adjusting the height of the work table. This is accomplished by means of bell crank lever connections comprising the arms 46 which pivotally support the bars 41 (the links 87 acting on the second support or shaft 47), and the second arm 52 affixed to the shaft 47, at the end of which is a fulcrum point adjustable by means of the handle 21.

The upper ends of a pair of table lifting links 87 (Figures 4 and 5) are pivotally secured to opposite ends of the shaft 47. The lower ends of the links 87 are pivotally supported by pins 88, carried in bifurcated arms 89, secured to a treadle shaft 91 (Figure 5) by means of keys 92. The shaft 91 is supported in bearings 93 formed in the lower portion of the base 10. The treadle 12, includes a pair of treadle levers 94, positioned outside of the base 10 and secured to opposite ends of the treadle shaft 91 by keys 96. A treadle bar 97 extends between the unsupported ends of the treadle levers 94. A treadle stop lever 98 (Figure 4) is secured to the shaft 91 midway of its length, by means of a key 99, and when the treadle 12 is released, the weight of the table 13 causes one arm 101 of this lever to engage an abutment 102 protruding inward from the base 10, thus limiting the upward movement of the treadle 12 and the downward movement of the table 13. Another arm 103 of the lever 98 has an enlarged hole 104 into which extends a reduced end 105 of a treadle stop lever adjusting screw 107, that is screwed into a boss 108 formed as a part of the base 10. The threaded end of the screw 107, that extends outside of the base 10, carries the hand wheel 16. The screw 107 and the arm 103 provide means for adjusting the lift of the table 13, or the distance it is raised when the treadle 12 is depressed.

After a plate 14, is positioned on the work table and clamped in place by manipulating the hand wheels 26 and 38; if the plate is heavy the hand wheel 17 may be turned to increase tension on the spring 71 and thereby reduce the treadle pressure that would otherwise be required to lift the table, but if the plate is light, the hand wheel 17 is turned in the opposite direction and reduces the tension on the spring to the extent necessary to compensate for the lesser weight of such a plate. It is thus possible for an operator to make adjustment for the treadle pressure he prefers to use, and thus keep the treadle pressure the same for plates of all sizes. Turning the hand wheel 21 adjusts the depth to which the router bit cuts when the treadle is pressed down. When the hand wheel 21 is turned to swing the arm 52 clockwise (as seen in Figure 4) about the axis of the shaft 47, it raises the table and increases the depth of the cut, whereas turning the hand wheel 21 in the opposite direction lowers the table and makes a shallower cut.

Figure 4 shows the treadle 12 depressed and the table 13 and plate 14 raised.

Figure 2:
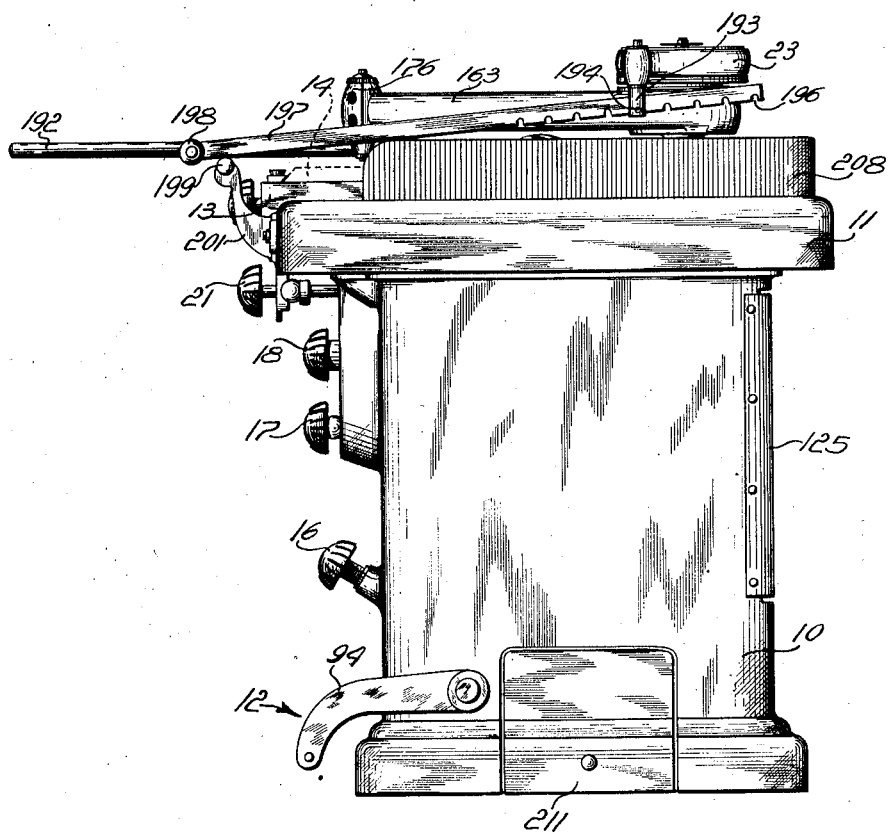
Figure 2 is a side elevational view of the machine shown in Figure 1.

The hollow cylindrical post 22 (Figures 6 and 8) is secured to the top of the frame 11 by a plurality of bolts 117. A hollow cylindrical sleeve 108, having a flanged portion 109, is rotatably supported inside of the post 22 by anti-friction bearings comprising balls 110 at the upper portion, and the lower portion of the sleeve 108 is supported by balls 111 that engage a ring 112 secured to the sleeve 108 by bolts 113. A pair of upper and lower ball bearings 114, respectively carried by an upper portion of the sleeve 108, and the lower portion of the sleeve 108 and ring 112, rotatably support a vertically disposed shaft 118, the lower end of which carries an adjustable diameter V-belt pulley 119 (Figure 6), having an upper face 121 and a lower face 122. The pulley adjustment is biased toward maximum diameter by a spring 123 that is held on the lower end of the shaft 118 by a washer 124 and a nut 126. The pulley 119 is driven by a relatively wide V-belt 127 that is adapted to run on a flat pulley 128 carried on the end of a shaft of a motor 129 (Figure 6). The motor, that is enclosed within the base 10, may be inspected by removing a cover 125 (Figure 2). The base of the motor is secured to a pair of straps or arms 131 by bolts 132, and the straps, by means of bolts 130, are secured to a vertically disposed shaft 133, that is rotatable in upper and lower brackets 134 (Figures 4 and 5). The front end of the straps 131 rotatably support opposite ends of a pin 136 having a threaded diametral hole 137 into which is screwed the threaded end of a motor adjusting screw 138. The unthreaded end of the screw 138 passes through a hole 139 in the front wall of the base 10 and through a diametral hole 141 in a swivel block 142, and the front end of the screw 138 carries the hand wheel 18. By turning the hand wheel 18 in one direction, the arms 131 and the motor 129 carried thereby, are swung about the axis of the shaft 133 (Figure 5), and the pulley 128 (Figure 6) is moved away from the variable speed pulley 119, thus further separating the pulley faces 121 and 122 and reducing the diameter of the portion of the pulley engaged by the belt and thereby increasing the speed of the shaft 118. Turning the hand wheel 18 in the opposite direction will obviously decrease the speed of the shaft 118.

The main router arm 23 (Figure 8) is preferably formed as a hollow casing, and has one end secured to the flange 109 of the sleeve 100 by bolts 115. The supported end of the arm 23 has an upwardly facing opening 106 that is closed by a removable cover plate 120. A crowned pulley 143 and a spacing nut 135 are secured on the upper portion of the shaft 118 and a second nut 140 secures a plate 145 on the upper end of the shaft. The pulley 143 drives a belt 144 which runs in the hollow arm 23 and drives a crowned pulley 146, also within the arm 23. The crowned pulley 146 and a spacer nut 148 are secured on the upper portion of a shaft 147 and a second nut 149 secures a plate 151 on the upper end of the shaft 147, that is rotatably supported in a pair of upper and lower ball bearings 160. These bearings are held in a hub 161 that is secured to a lower portion of the arm 23 by bolts 162. One end of a hollow router head arm 163 is rotatably supported from the hub 161 by a pair of collars 164 and 166, and a plurality of balls 167 positioned in raceways formed in the collars and the hub 161, thus providing an anti-friction bearing. The two collars are held together by screws 168, and the upper collar 166 is secured to the upper face of the router head arm 163 by bolts 169. The hollow arm 163 houses the lower end of the shaft 147 to which a pulley 171 is secured and capped by a screw 172. The pulley 171 drives a belt 173 that extends through the hollow arm 163 to a pulley 174 (Figures 6 and 7) that is encased in a router head 176 carried at the outer end of the arm 163. The arm 23 (Figures 6 and 8) has an opening 177, covered by a removable plate 178, that affords access to the pulley 146 and the belt 144. The arm 163 also has an opening 179, covered by a removable plate 181, that affords access to the pulley 171 and the belt 173.

The router head 176 (Figures 6 and 7) and its cap 182 carry ball bearings 183 which support a vertical shaft 184. The lower end of this shaft carries a fan 187 and a chuck 188 for holding the router bit 19, while the upper end of the shaft carries a knob 186 for tightening the chuck. A bracket 189 extending from the side of the router arm 163, supports one end of a handle bar 192, that is secured to the bracket by bolts 191. The tapered extreme end of the main arm 23 (Figures 1 and 2), carries a swivel fork 193 that has a pin 194 for engaging any one of a plurality of notches 196 formed on the lower edge of a main arm handle 197. The free end of the handle is provided with a knob 198, and an intermediate portion of the handle rests on a guide 199 that is carried by a pair of brackets 201 protruding from the frame 11.

From the foregoing description it will be seen that with the mechanism herein disclosed, the router head 176 is mounted for free movement in any direction in a horizontal plane, but is not vertically movable.

A push button station 206 (Figure 1), having both a start and a stop button, is recessed into the front face of the frame 11, and by means of suitable electric conductors and a motor starting switch (not shown), controls the starting and stopping of the motor 129.

As previously stated, the effective diameter of the variable speed pulley 119 is changed by swinging the motor 129 with the shaft 133 as a pivot. Thus the angular position of the shaft is a measure of the speed at which the router bit 19 will rotate when running. This is shown by a speed indicator 207 (Figures 9 and 10). One end of a lever 202 is secured to the upper end of the shaft 133 by screws 205, and one end of a cable 203 is secured to an intermediate portion of the lever by an eye bolt 227. A pointer 204 is secured to one end of a shaft 212, that is journaled in a bracket 213, and the bracket is secured to the frame 11 by screws 214. A pulley 216 is secured to an intermediate portion of the shaft 212, and a segmental dial 217 is adjustable around the shaft by being held to the bracket 213 by a screw 218 passing through a slotted hole 219. A bracket 221, held to the frame 11 by screws 222, rotatably supports pulleys 224 and 226, and the cable 203 passes from the eye bolt 227 over the pulley 224, around the pulley 216, over the pulley 226 and then is secured to one end of a spring 228. The other end of the spring is secured to the frame by an eye bolt 231. As the shaft 133 is angularly displaced, the lever 202 moves one end of the cable 203, which increases or decreases the length of the spring 228 and rotates the pulley 216, thus moving the pointer 204 to indicate the approximate speed of the router bit. It will be noted that the pointer 204 indicates the speed at which the router bit will run regardless of whether the motor and bit are running or not.

Figure 3:
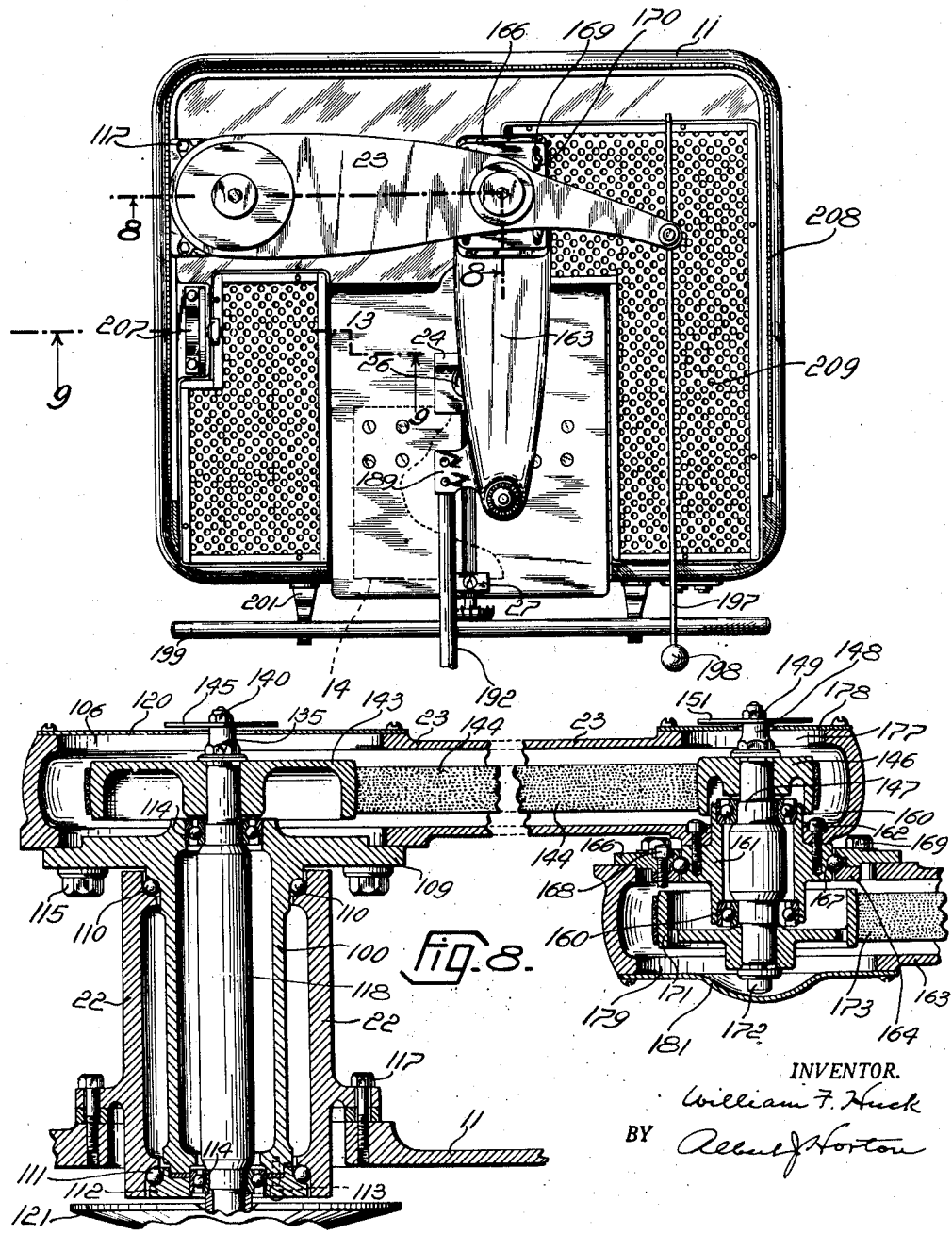
Figure 3 is a top plan view of the machine shown in Figures 1 and 2.

The frame 11 (Figures 2 and 3) is provided with a chip guard 208 and a multiplicity of holes 209 through which chips produced by the router bit may fall. The chips drop on inclined surfaces which direct them to the bottom of the base 10, and they can be then removed through a door 211.

During operation of the machine, the operator grips the knob 198 in the right hand and the bar 192 in the left hand, and thereby manipulates the router bit to any desired portion of the plate 14. Also by using the treadle 12, the operator can, in a manner hereinbefore described, raise the plate 14 toward the bit 19. When the operator removes his foot from the treadle bar 97, the plate 14 automatically drops to a position below the router bit. Thus there is no danger of the router bit damaging the plate by unintentional contact therewith.

The belt 144 can be removed or installed by removing the plates 120, 145, 178 and 151, and the belt 173 can be removed or installed by removing the plate 181 and the cap 182. Tension on the belt 173 can be adjusted by means of the bolts 169 and slotted holes 170, and tension on the belt 144 can be varied by adjusting the position of bolts 115 in slotted holes, not shown.

It will be understood that the invention may be embodied in other specific forms without departing from the spirit or essential attributes thereof, and it is therefore desired that the present embodiment be considered in all respects as illustrative and not restrictive, reference being made to the claims rather than to the foregoing description for an indication of the scope of the invention.

What I claim is:

1. In a routing machine for operating upon flat printing plates, a router head swingably supported for movement limited to one horizontal plane, and a work table mounted for vertical movement toward and away from the router head; the mechanism for moving the work table including a pair of vertically disposed lifting rods, a horizontally disposed shaft, a pair of first arms keyed to the shaft and supporting the rods by a pivotal connection, a balancing spring partially supporting the said shaft, an adjustable second arm positioned for supporting the spring, a third arm keyed to the shaft and adjustably arranged to rotate the shaft and thereby raise and lower the first arms and the rods, a pair of vertically disposed links connected to the said shaft independently of the balancing spring, a treadle connected to the links for raising and lowering the shaft, and a stop for limiting the movement of the treadle.

2. In a routing machine for operating upon flat printing plates, a router head swingably supported for movement limited to a horizontal plane, a bit rotatably supported from the router head, a drive for the rotating bit, and a work table mounted for vertical movement toward and away from the router head; the mechanism for supporting the router head and for driving the router bit including a hollow vertical post, a hollow sleeve turnably supported in the post, a hollow router arm, one end of which is supported from the sleeve, a drive shaft rotatably supported in the sleeve, and a means enclosed within the said router arm for driving the router bit from the shaft.

3. In a routing machine for operating upon flat printing plates, a router head swingably supported for movement in only one horizontal plane, and a work table mounted for vertical movement toward and away from the router head; the mechanism for moving the work table including a vertically disposed support, a horizontally disposed support, a connection secured to the horizontally disposed support and arranged to pivotally support the vertically disposed support, an adjustably supported resilient member for supporting the horizontally disposed support, and an elevator for raising and lowering the horizontally disposed support.

4. In a routing machine for operating upon flat printing plates, a router head swingably supported for movement in only one horizontal plane, and a work table mounted for vertical movement toward and away from the router head; the mechanism for moving the work table including a first support for supporting the work table, a second support, a lever connection secured to the second support and arranged to pivotally support the first support, an adjustable fulcrum for the said lever connection, and an adjustable resilient member for supporting the second support, and an elevator for raising and lowering the second support.

WILLIAM F. HUCK.

REFERENCES CITED

The following references are of record in the file of this patent:

UNITED STATES PATENTS

| Number | Name | Date |
|---|---|---|
| 462,671 | Moseley | Nov. 3, 1891 |
| 840,765 | Goss | Jan. 8, 1907 |
| 729,896 | Royle | June 2, 1908 |
| 1,058,537 | Bonner | Apr. 8, 1913 |
| 1,487,773 | Weston | Mar. 25, 1924 |
| 1,905,448 | Dixon | Apr. 25, 1933 |
| 1,959,269 | Gorton | May 15, 1934 |
| 2,203,743 | Parsons | June 11, 1940 |
| 2,208,430 | Ostler | July 16, 1940 |